J. E. COX.
CORN PLANTER ATTACHMENT.
APPLICATION FILED JUNE 16, 1915.
1,181,436.
Patented May 2, 1916.
2 SHEETS—SHEET 1.
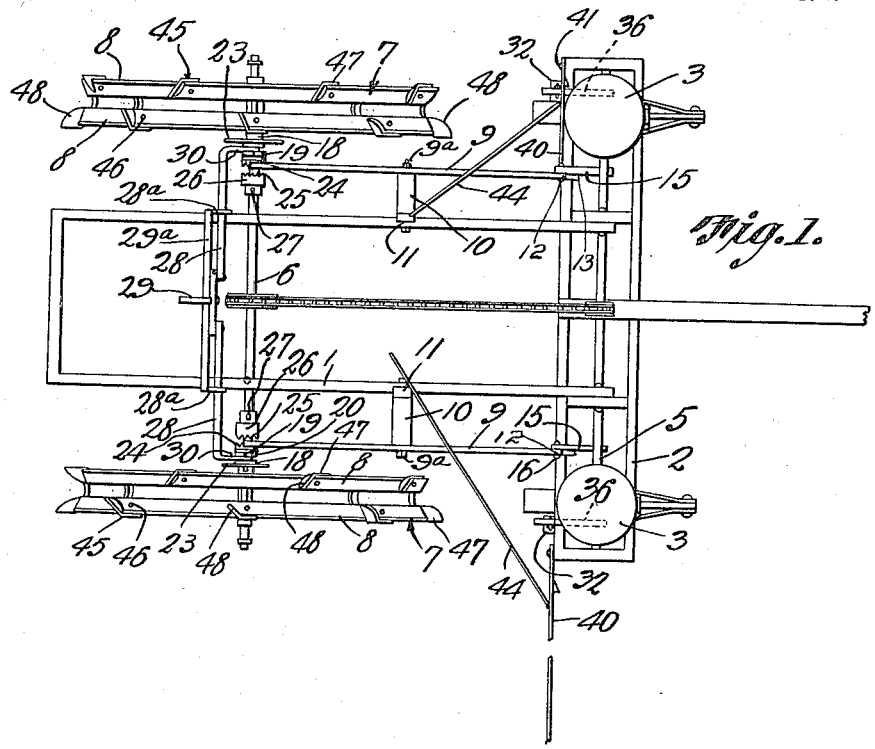
Fig. 1.
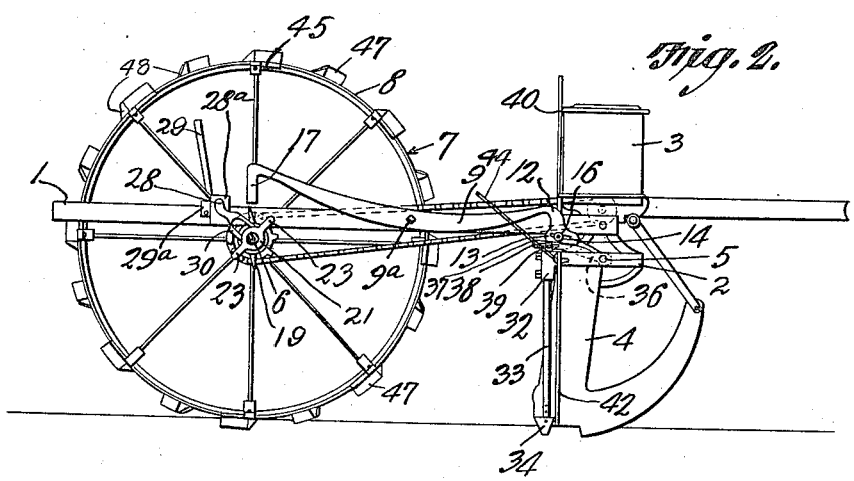
Fig. 2.
Witnesses
J. E. Cox    Inventor
by
Attorneys

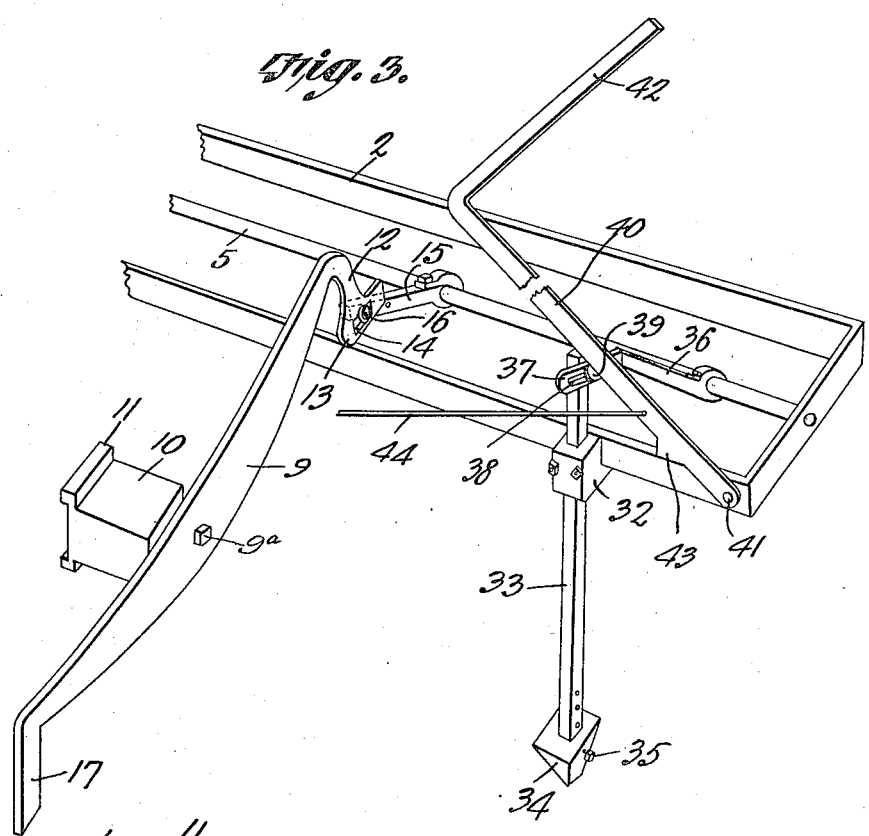

UNITED STATES PATENT OFFICE.

JOHN E. COX, OF ABINGDON, ILLINOIS.

CORN-PLANTER ATTACHMENT.

1,181,436. Specification of Letters Patent. Patented May 2, 1916.

Application filed June 16, 1915. Serial No. 34,465.

*To all whom it may concern:*

Be it known that I, JOHN E. COX, a citizen of the United States, residing at Abingdon, in the county of Knox and State of Illinois, have invented a new and useful Corn-Planter Attachment, of which the following is a specification.

The present invention appertains to planters, and relates more particularly to a wireless check row attachment for corn planters.

It is the object of the invention to provide a novel and improved attachment for a corn planter, which is operable to drop the seed properly at suitably spaced points, without the employment of ordinary check wire, it being well known that the use of a check wire entails considerable trouble.

The invention includes improved details of construction of the attachment, to enhance the utility and efficiency thereof.

It is also within the scope of the invention to provide a wireless check row attachment which may be applied to various planters, and which is comparatively simple and inexpensive in construction, as well as being convenient, practical and efficient in operation.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1 is a plan view of a corn planter having the attachment applied thereto, portions being broken away and removed. Fig. 2 is a fragmental side elevation of the planter having the attachment applied thereto, portions being removed. Fig. 3 is an enlarged fragmental perspective view illustrating a portion of the attachment. Fig. 4 is an enlarged perspective view of another portion of the attachment which is carried by the axle. Fig. 5 is an enlarged sectional detail through the fulcrum of one of the levers.

The corn planter illustrated is of common construction, and need not be considered in detail, the invention residing in the attachment which is applied to the planter. This planter comprises a longitudinal frame 1 having a transverse portion 2 at its forward end carrying the seed hoppers or bins 3, and the depending boots 4 for delivering the dropped seed to the ground. The portion 2 also carries a transverse seed dropper shaft 5 which when rocked or oscillated is adapted to drop the seed down the boots 4 in the ordinary manner. The frame 1 is carried by an axle 6 having the ground wheels 7 secured upon the protruding ends thereof, the tires or rims of the wheels 7 having spaced annular sections 8 adapted to run upon the soil at the opposite sides of and adjacent the row immediately in rear of the boots 4.

The attachment embodies a pair of longitudinal levers 9 which are fulcrumed intermediate their ends, by means of bolts 9$^a$, to fulcrum blocks 10 attached by means of said bolts to the side beams of the frame 1 between the axle 6 and dropper shaft 5. The blocks 10 have the portions 11 to partially surround the side beams of the frame, and the bolts 9$^a$ are engaged through the levers 9, blocks 10 and side beams of the frame 1. The bolts 9$^a$ have shoulders 9′ bearing against the blocks 10, whereby when the bolts are tightened, they will not clamp the levers 9, but will clamp the blocks 10 tightly against the frame. The blocks 10 project outwardly from the frame, and the levers 9 are fulcrumed to the outer ends of the blocks. The forward ends of the levers 9 have downturned portions 12 provided with longitudinal heads 13 provided with longitudinal slots 14, and rearwardly and upwardly projecting arms 15 are secured to the dropper shaft 5 adjacent the forward ends of the levers 9, and have adjustable bolts or elements 16 at their free ends which work in the slots 14. The rear ends of the levers 9 have downturned portions 17.

Collars 18 are mounted slidably and rotatably upon the axle 6 at the opposite sides of the frame 1, and are provided with radially projecting tappets or cams 19, and with annular grooves 20. The members 21 are fastened by means of screws or other securing elements 22 to those faces of the collars 18 opposite the tappets 19, and are provided with outstanding handles 23, which enable the collars 18 to be rotated or set to the positions desired. Those faces of the collars 18 adjacent the tappets 19 are provided with radial teeth 24 to engage the radial teeth 25 provided in the adjacent sides of collars 26 secured by means of set screws 27 upon the axle 6 adjacent the collars 18. The collars 26 are fixed upon the axle, while the collars 18 are mounted loosely upon the axle. When the collars 18 are slid against the collars 26, the teeth 24 and 25 in interengaging, cause the collars 18 to be rotated with the collars 26 and axle 6. The parts are so arranged, that when the collars 18 are moved against the collars 26, the tappets 19 will be moved under the downturned portions 17 of the levers 9, to operatively connect said levers with the axle.

As a means for sliding the collars or clutch members 18, to engage and disengage the collars or clutch members 26, transverse bars 28 are guided for sliding and oscillatory movements through guide members 28ª attached to the frame 1, and the remote ends of the bars 28 have angularly projecting forks 30 engaging within the grooves 20 of collars 18, whereby when the bars 28 are moved toward and away from one another, the collars 18 will be slid to and from the collars 26. The adjacent ends of the bars 28 are connected by a T-lever 29 fulcrumed to a cross piece 29ª carried by the frame 1, which lever, may be moved by the hands or feet of the operator for shifting the bars 28 to one position or the other.

The attachment has hill markers, and to this end, guide blocks 32 are attached to the rear bar of the portion 2 adjacent the hoppers or bins 3, and vertical standards 33 are slidable through the guide blocks 32. Marking heads 34 are slidably mounted upon the lower ends of the standards 33, and are adjustably held in position by means of set screws 35 carried thereby to engage the standards 33. Rearwardly and upwardly projecting arms 36 are secured to the dropper shaft 5 in front of the blocks 32, and are provided at their free ends with angularly projecting portions 37 having the slots 38 in which bolts 39 work, said bolts being engaged to the upper ends of the standards 33. Row markers are also employed, for marking the new rows parallel with the rows being planted, and to this end bars or arms 40 are pivoted, as at 41, to the ends of the portion 2 of the planter frame, and are provided at their free ends with angularly extending marking terminals 42 which depend when the bars 40 are swung outward to operative positions. The bars 40 may be swung upwardly and inwardly out of the way, when desired, and the bars 40 are provided with lugs 43 adapted to rest upon the portion 2 of the frame when the bars are swung inwardly, as seen in Fig. 3, so that the bars 40 will be supported in inoperative position, without interfering with the working parts of the planter or attachment. The bars 40 may be raised by means of wires or cables 44 attached thereto, so that the operator may raise the row markers whenever desired, should it be desired to raise the row markers, or should the marking terminals 42 strike unyielding objects.

The wheels 7 are provided with devices that act as tractors, to prevent the wheels from slipping, and which also serve to cultivate or work the soil, and to throw the soil inwardly over the row of seed. To this end, plates 45 are secured to the inner sides of the annular sections 8 of each wheel 7, by means of bolts or other securing elements 46, and the plates 45 are provided at their remote edges with outturned flanges 47 projecting from the tire sections 8. The flanges 47 are provided with oblique deflectors 48 extending over the treads of the tire sections 8 to points adjacent the inner edges of the said sections. At the rear side of the wheels 7, the deflectors or portions 48 project downwardly, whereby the soil between the flanges 47 will be directed inwardly by the deflectors 48 onto the row of planted seed between the tire sections 8.

In operation, when the planter is being run onto or off of the field, or when it is not desired to operate the dropper shaft 5, the bars 28 are slid by swinging the lever 29 to disengage the collars 18 from the collars 26, which will remove the tappets 19 from under the levers 9, so that said levers will not be operated for operating the dropper shaft 5. The axle 6 will thus rotate idly without operating the dropper shaft. Now, when the planter is started down the field for planting the two rows of corn, the bars 28 are moved to bring the collars 18 into engagement with the collars 26, whereby the collars 18 are rotated with the axle 6, and furthermore, the tappets 19 will be brought under the downturned portions 17 of the levers 9, so that said levers will be operated. When the tappets 19 move upwardly, they raise the portions 17, and when the tappets 19 leave the portions 17, the rear ends of the levers 9 drop. The levers 9 are thus intermittently actuated during the movement of the planter across the field, and when the levers 9 are operated, the forward ends thereof are depressed, so as to depress the arms 15 for rocking the dropper shaft 5. When the shaft 5 is thus oscillated, the seed is allowed to drop down the boots 4. When the shaft 5 is operated, it will swing the arms 36 downwardly, to depress the standards 33, whereby the heads 34 are forced into the ground and adjacent the hills just planted, so that the hills will be marked by dots or depressions in the ground. The row marker at the unplanted side of the field is swung downwardly or outwardly to operative position, while the other row marker is swung upwardly to inoperative position. The active row marker will mark a line in the ground, since the terminal 42 drags over the ground, and this line is used as a guide for planting the succeeding two rows of corn. When the planter is moved in one direction, one row marker is employed, while the other row marker is used on the planter when moved in the other direction, as will be obvious, and which enables a line to be made in the ground at the unplanted side of the field to assist the operator in properly running the planter over the ground, and so that the planted rows will be parallel.

When the end of the planted rows is reached, the planter is turned around, and the proper boot 4 is brought upon the line previously made by the row marker, and the collars 18 are rotated by means of the handles 23, to bring the tappets 19 at proper positions, so they will operate the levers 9 at such times, that the new hills will be located exactly opposite the planted hills. The row markers are also changed at the beginning of the rows.

When the machine is being turned around at the ends of the rows, the bars 28 are shifted to disengage the collars 18 from the collars 26, which will render the seed dropping means inoperative until the machine is again started down the field.

The flanges 47 and their deflectors 48 in entering the soil, will prevent the wheels 7 from slipping, as would be detrimental for obvious reasons. Furthermore, the flanges 47 and their deflectors 48 will work the soil at the opposite sides of the rows of planted seed, whereby the germination of the seed will be helped. When the flanges 47 and deflectors 48 leave the ground, the deflectors 48 will tend to raise the soil therewith, and the soil will fall inwardly off of the deflectors 48 onto the rows of seed. In this manner, the wheel attachments serve as tractors, as soil working elements, and as deflectors for covering the planted seed.

Having thus described the invention, what is claimed as new is:

The combination with a planter embodying a frame, a seed dropper shaft and a rotatable axle, of a wireless check row attachment comprising a lever fulcrumed intermediate its ends to the frame, the forward end of said lever having a slot, an arm attached to said shaft and having a portion working in said slot, the rear end of the lever having a downturned portion, a clutch collar fixed upon the axle, a second clutch collar movable loosely upon the axle, means for moving the second clutch collar into and out of engagement with the fixed clutch collar, and radial tappets carried by the second mentioned clutch collar and movable under said downturned portion when the two clutch collars are in engagement.

In testimony that I claim the foregoing as my own, I have hereto affixed my signature in the presence of two witnesses.

JOHN E. COX.

Witnesses:
ORION LATIMER,
REED Y. CAMPBELL.